US012632948B2

(12) United States Patent (10) Patent No.: US 12,632,948 B2

Mulchandani et al. (45) Date of Patent: May 19, 2026

(54) MACHINE LEARNING ASSESSMENT OF AUTONOMOUS DRILL BIT HARD FACE QUALITY

(71) Applicant: Schlumberger Technology Corporation, Sugar Land, TX (US)

(72) Inventors: Kishore Mulchandani, Menlo Park, CA (US); Crispin Chatar, Katy, TX (US); Ronda Shepherd, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/136,910

(22) PCT Filed: Dec. 5, 2023

(86) PCT No.: PCT/US2023/082404

§ 371 (c)(1),
(2) Date: Jun. 9, 2025

(87) PCT Pub. No.: WO2024/129425

PCT Pub. Date: Jun. 20, 2024

(65) Prior Publication Data

US 2026/0010997 A1 Jan. 8, 2026

Related U.S. Application Data

(60) Provisional application No. 63/387,509, filed on Dec. 15, 2022.

(51) Int. Cl.
*G06T 7/00* (2017.01)
*E21B 10/42* (2006.01)
(Continued)

(52) U.S. Cl.
CPC ............ *G06T 7/0004* (2013.01); *G06T 11/26* (2026.01); *G06T 15/00* (2013.01); *G06T 19/00* (2013.01);
(Continued)

(58) Field of Classification Search
None
See application file for complete search history.

(56) References Cited

U.S. PATENT DOCUMENTS

2011/0120780 A1 5/2011 Vezirian

FOREIGN PATENT DOCUMENTS

CN 107560542 A 1/2018
CN 111651915 A 9/2020
(Continued)

OTHER PUBLICATIONS

International Search Report and Written Opinion of International Patent Application No. PCT/US2023/082404 dated on Mar. 27, 2024, 10 pages.

*Primary Examiner* — Peter Hoang
(74) *Attorney, Agent, or Firm* — Kyle R. Miiller

(57) ABSTRACT

A method including receiving a three-dimensional scan of a coating that coats an object. The coating and the object, in combination, have a shape. The method also includes flattening the three-dimensional scan to generate flattened data. Flattening includes conforming scan data in the three-dimensional scan to zone data for zones of a layout. The zones represents sections of the shape cut along boundaries in the shape. Each of the zones represents a corresponding thickness of the coating in a corresponding section of the sections. The method also includes vectorizing the flattened data into a vector data structure. The method also includes generating a prediction whether one or more zones of the zones are out of an engineering tolerance for the coating.

(Continued)

Generating the prediction is performed by a machine learn-
ing model that takes, as input, the vector data structure and
produces, as output, the prediction.

15 Claims, 7 Drawing Sheets

(51) Int. Cl.
  *G06T 11/26*        (2026.01)
  *G06T 15/00*        (2011.01)
  *G06T 19/00*        (2011.01)
(52) U.S. Cl.
  CPC ..... *E21B 10/42* (2013.01); *G06T 2207/20081*
      (2013.01); *G06T 2207/20084* (2013.01); *G06T*
          *2207/30164* (2013.01); *G06T 2210/56*
                              (2013.01)

(56)              References Cited

FOREIGN PATENT DOCUMENTS

CN        113327279  A      8/2021
EP          0699279  B1      3/1999

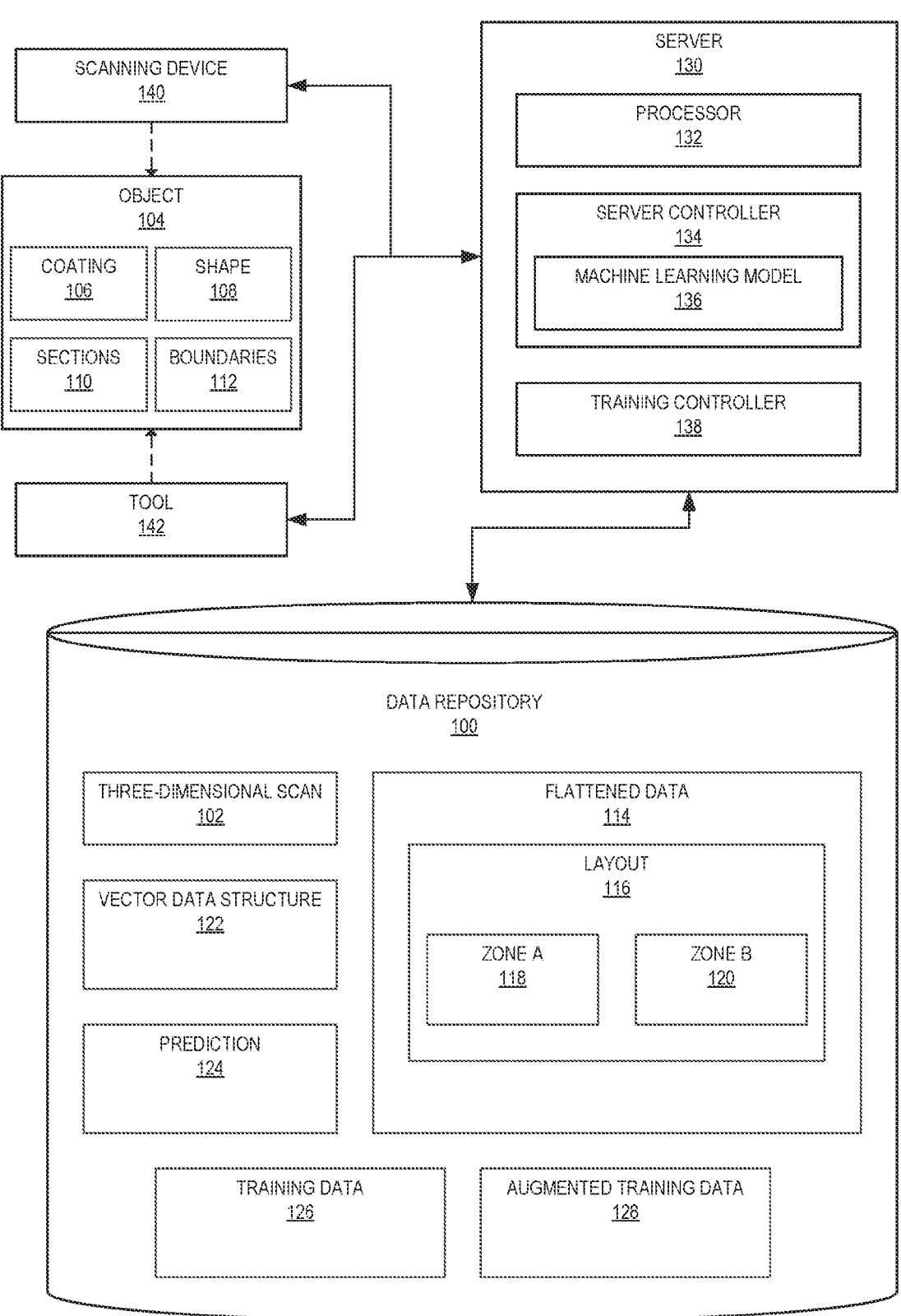
*FIG. 1.1*

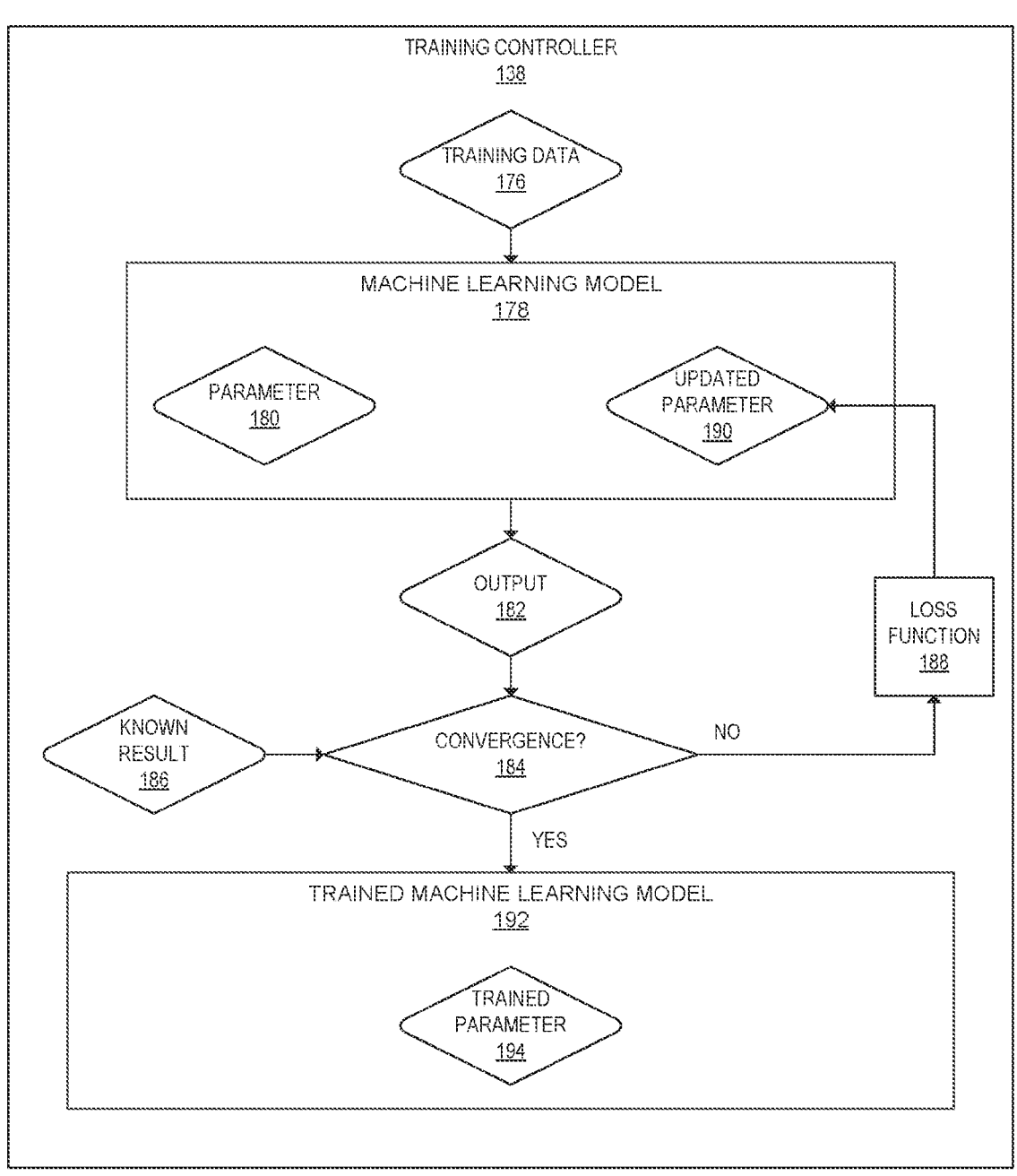
*FIG. 1.2*

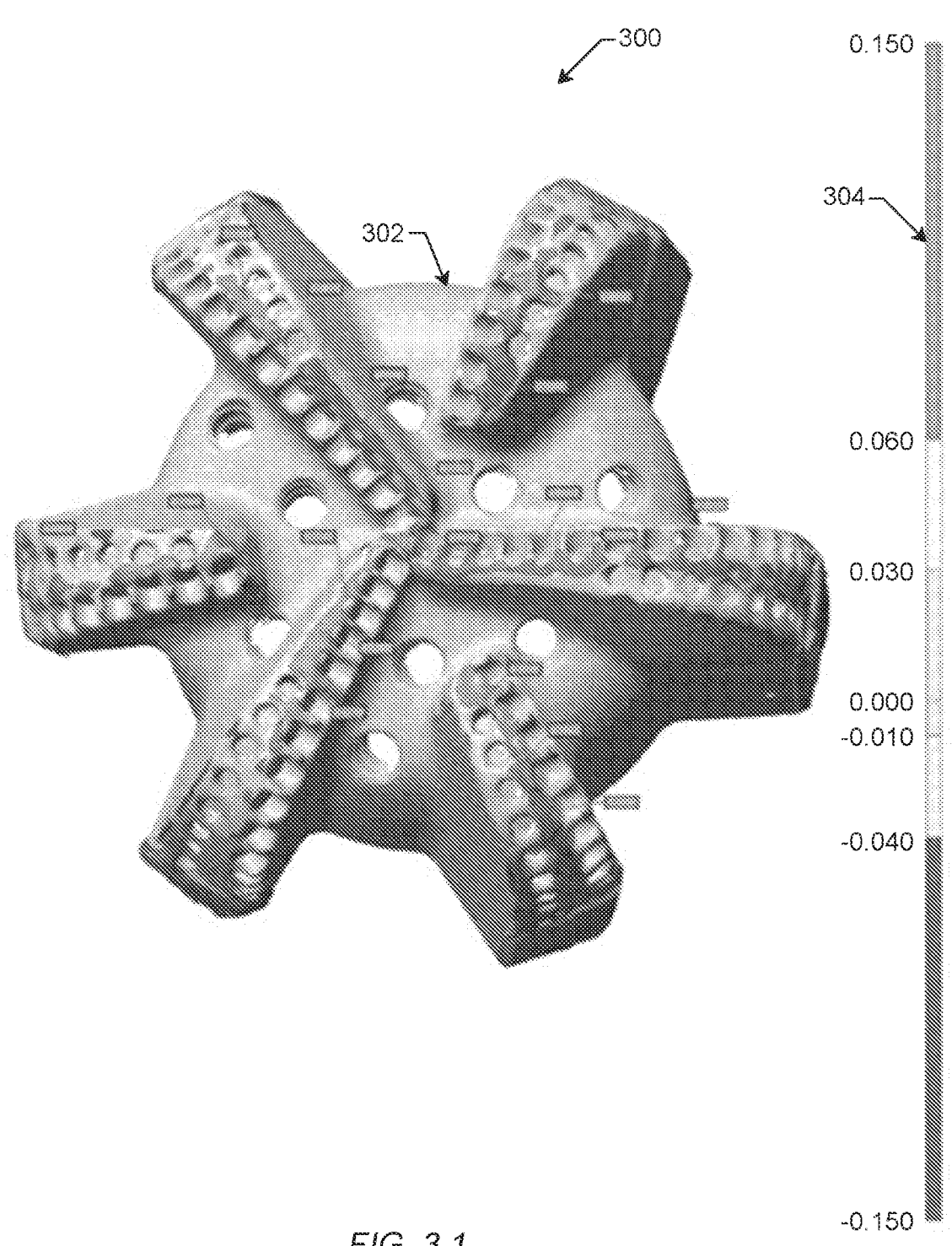
*FIG. 3.1*

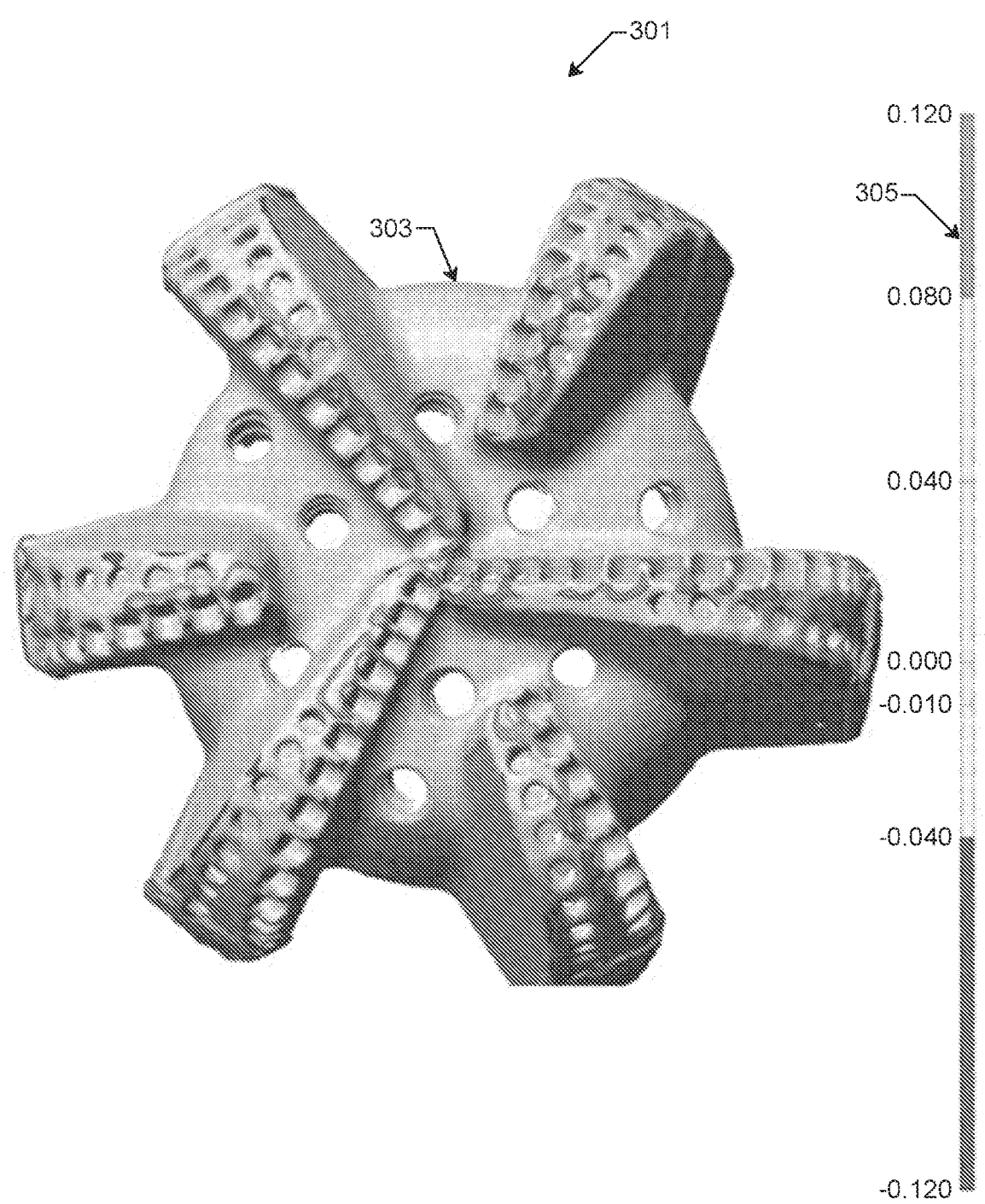
FIG. 3.2

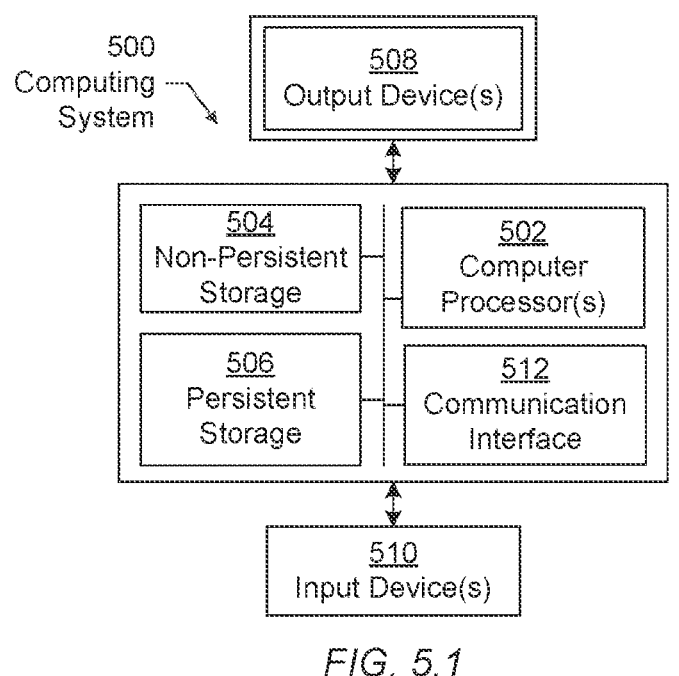
*FIG. 5.1*
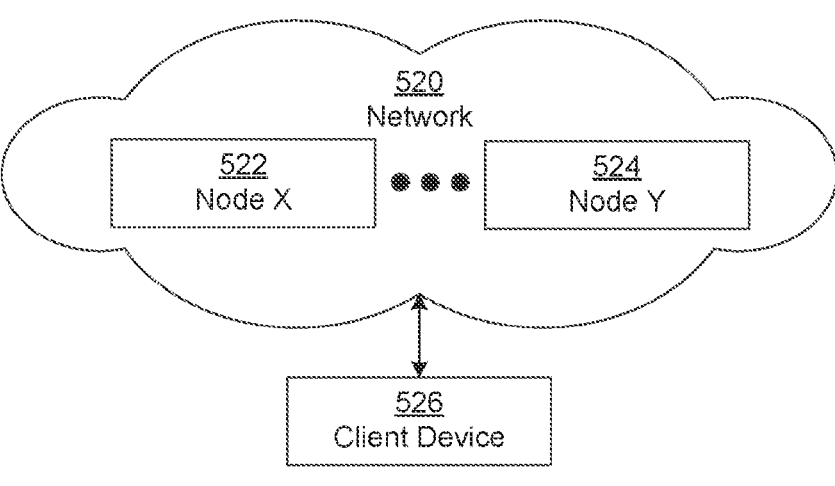
*FIG. 5.2*

MACHINE LEARNING ASSESSMENT OF AUTONOMOUS DRILL BIT HARD FACE QUALITY

CROSS-REFERENCE TO RELATED APPLICATIONS

This application is a National Stage Entry of International Application No. PCT/US2023/082404, filed Dec. 5, 2023, which claims priority to U.S. Provisional Patent Application 63/387,509, filed Dec. 15, 2022, the entirety of which is hereby incorporated by reference.

BACKGROUND

Drill bits are used to drill into the surface of the Earth during oil exploration and production. Drill bits, when used for drilling, are subject to wear and tear. Improvements are needed in the speed and accuracy of generating specific coating patterns to apply to drill bits for particular drilling operations.

SUMMARY

One or more embodiments provide for a method. The method includes receiving a three-dimensional scan of a coating that coats an object. The coating and the object, in combination, have a shape. The method also includes flattening the three-dimensional scan to generate flattened data. Flattening includes conforming scan data in the three-dimensional scan to zone data for zones of a layout. The zones represents sections of the shape cut along boundaries in the shape. Each of the zones represents a corresponding thickness of the coating in a corresponding section of the sections. The method also includes vectorizing the flattened data into a vector data structure. The method also includes generating a prediction whether one or more zones of the zones are out of an engineering tolerance for the coating. Generating the prediction is performed by a machine learning model that takes, as input, the vector data structure and produces, as output, the prediction.

Other aspects of one or more embodiments will be apparent from the following description and the appended claims.

BRIEF DESCRIPTION OF DRAWINGS

FIG. 1.1 shows a computing system, in accordance with one or more embodiments.

FIG. 1.2 shows a training controller for the system shown in FIG. 1.1, in accordance with one or more embodiments.

FIG. 3.1 and FIG. 3.2 show examples of coating profiles of a coating disposed on a drill bit, in accordance with one or more embodiments.

FIG. 5.1 and FIG. 5.2 show a computing system and network environment, in accordance with one or more embodiments.

Like elements in the various figures are denoted by like reference numerals for consistency.

DETAILED DESCRIPTION

Figure 2:
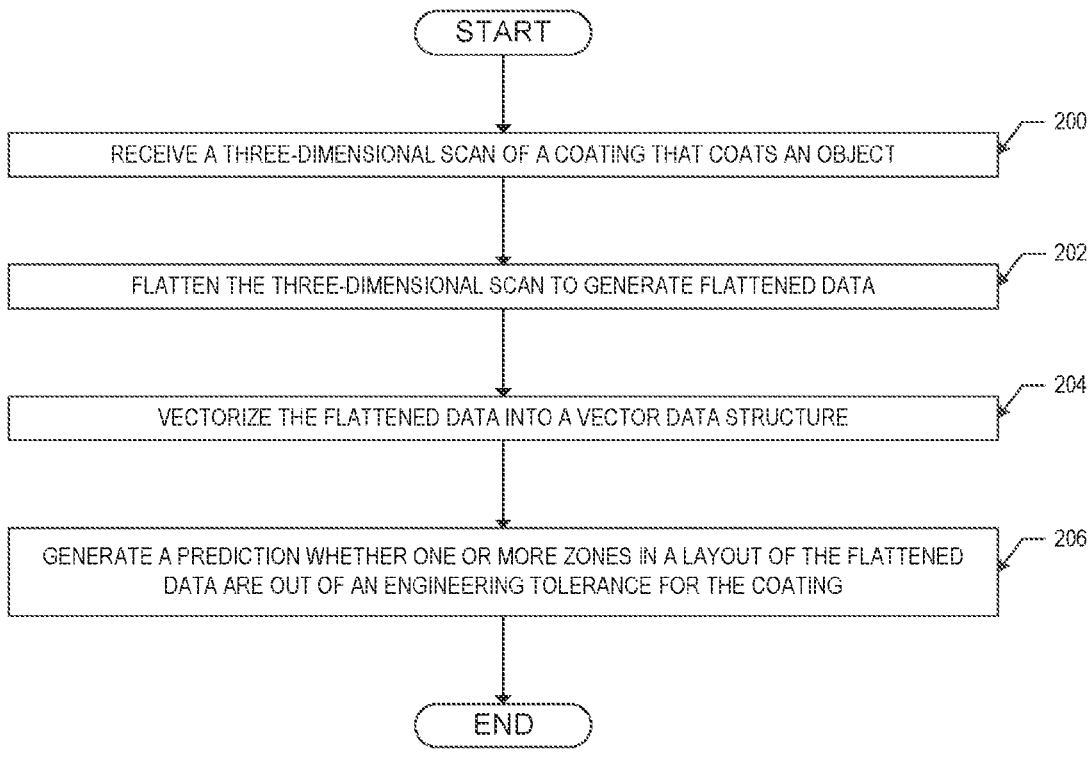
FIG. 2 shows a method, in accordance with one or more embodiments.

In general, one or more embodiments are directed to characterizing and improving the hard facing of drill bits. In particular, one or more embodiments are directed to an improved machine learning technique for characterizing a coating placed on a drill bit and proceeding accordingly. For example, if the drill bit or the coating is within an engineering tolerance, then the drill bit may be sent for use in a drilling operation. In another example, if the drill bit or the coating is outside the engineering tolerance, then the drill bit, the coating, or both may be reworked. The techniques described herein are extendable to other objects and coatings, as well as to evaluating the shape of objects or coatings under inspection.

Attention is returned to the drill bit example. To help resist wear and tear, a drill bit may be hard faced during a process sometimes known as hard facing. Hard facing of drill bits may enhance the life of a drill bit. Hard facing may be accomplished by coating non-cutting surfaces of the face of the drill bit with a hard substance, such as carbide. The process may involve heating the drill bit to predetermined temperatures (generally, very hot relative to room temperature) and depositing the carbide or other coating onto the face of the drill bit.

The thickness of the drill bit coating may have low engineering tolerances. In some cases, the engineering tolerance may be a thickness range measured in micrometers to millimeters. A coating thickness outside the specified engineering tolerance can undesirably affect downhole performance of the drill bit.

Therefore, the coating of the drill bit may be examined after a coating procedure to ensure that the thickness of the coating is within engineering tolerances across various sub-areas of the drill bit. If the coating profile (i.e., the thickness of the coating across various sub-areas of the drill bit) is out of one or more of the engineering tolerances, then the coating of the drill bit may be reworked.

Reworking may involve reheating the drill bit, grinding or wiping the coating of the drill bit, adding additional coating material, and other procedures. Reworking may be expensive and time consuming, and further may delay hydrocarbon exploration and production, costing additional time and money. Therefore, unnecessary reworking is to be avoided, but in turn, it may be desirable to maintain tight engineering tolerances of a coating profile applied to the drill bit. The coating profile is a set of thicknesses of the coating at various points along the shape of the face of the drill bit.

Because of the wide variability in engineering tolerances for many different possible pre-determined coating profiles for many different drill bits, identifying whether a given applied coating profile is within desired engineering tolerances for a specified application is difficult. It is impractical to program a set of rules for statically determining whether a scanned coating profile is within the desired tolerances. In these cases, a human also cannot adequately optimize the coating profile of a drill bit for a particular drill bit intended to be used for a particular application, because even an expert human would have to guess a coating profile to be applied to the drill bit.

One or more embodiments address these and other issues by describing a method of training and using a machine learning model to characterize the coating placed on a drill bit face. An accurate, quantitative coating profile can then be determined. If the coating profile is within an acceptable engineering tolerance, then the drill bit may be passed for further processing or for use in the field. If the coating process is outside of an acceptable engineering tolerance, then the drill bit may be reworked. In yet another embodiment, the process of one or more embodiments may be performed continuously during coating in order to control the coating process (e.g., where the coating is applied, when the coating is applied, when to terminate the coating process for certain sub-areas of the drill bit face, when to terminate the overall coating process, etc.).

Additionally, one or more embodiments apply a method of training a machine learning model to determine whether a new scanned coating profile is within the desired tolerances. The machine learning model may not have been trained to analyze the specific drill bit and specific coating profile, but with the model trained on many different drill bits and many different labeled profiles (labeled as within tolerance or out of tolerance for each section of past drill bits), the trained machine learning model is able to analyze new scans of newly coated drill bits and determine or estimate whether the scanned coating profile is likely to be in engineering tolerance or out of engineering tolerance for a new drill bit intended for use in a new drilling operation.

Thus, one or more embodiments represent a technical approach to at least two technical issues. One technical issue is how to quantitatively optimize the coating to be applied to a new drill bit for a new drilling operation when information is available for different, older drill bits for older, different drilling operations. Another technical issue is how to apply machine learning to three-dimensional data that is not suitable for direct input into a machine learning model. The technical approach is to flatten the data, map the flattened data to a number of zones of a projected layout, and then vectorize the flattened data in the number of zones. The vectorized data may then be applied to a machine learning model, which may predict that neither a computer nor a human could mathematically optimize without the techniques described herein.

Attention is now turned to the figures. FIG. 1.1 shows a computing system, in accordance with one or more embodiments. The system shown in FIG. 1.1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) may store a three-dimensional scan (102). The three-dimensional scan (102) is a set of data obtained by a scanning device (140), defined below. The three-dimensional scan (102) may be an image that includes three-dimensional measurements of an object 104, defined below. For example, the three-dimensional scan (102) may be data obtained as part of a photogrammetry technique applied to measuring the object (104). The process of obtaining the three-dimensional scan (102) is described with respect to FIG. 2.

Attention is turned to the object (104), as other data stored in the data repository (100) relates to the object (104). The object (104) is a physical object. For example, the object (104) may be a drill bit. More generally, the object (104) may be any different type of objects for which photogrammetry processes and object shape optimization is desired.

The object (104) may be coated by a coating (106). The coating (106) is applied to a surface of the object (104). The surface may be the entire surface or only a portion thereof. In the case of a drill bit, the coating (106) may be a hardening material, such as carbide or diamond. Other types of coatings may be used depending on the drilling operation intended for the drill bit. The coating (106) may be dependent on the object (104) and the intended purpose of the coating.

The coating (106) may have a coating profile. A coating profile is a distribution of thicknesses of the coating (106)

over the sections (110) of the object (104). The coating profile may specify that the coating (106) over one sub-area of the object (104) is thicker or thinner relative to the thickness of the coating (106) over another sub-area of the object (104). The coating profile may be a pre-determined coating profile, which is a coating profile planned or intended to be distributed on the surface of the object (104). The coating profile may be a measured coating profile, which is a coating profile measured for a currently existing object having a currently existing coating. The measured coating profile may deviate from the pre-determined coating profile when coating the object.

The object (104) and the coating (106), taken together, may have a shape (108). The shape (108) is a shape of at least a portion of the coated surface of the object (104). The shape (108) may be a three-dimensional shape, but in another embodiment, the shape (108) may be a two dimensional shape.

The shape (108), when referred to without a qualifier (e.g., object shape, surface shape, and coating shape), is the shape of the coated surface. However, other shapes may be considered. For example, the object (104) may have an object shape, which is the overall shape of the object without the coating. The surface of the object (104) may have a surface shape, which is a shape of at least a portion of the surface of the object. The coating (106) may have a coating shape, which is a shape of the coating. Note that the object shape, the surface shape, and the coating shape could be different. However, again, the shape (108), when used alone, refers to the combination of the surface shape and the coating shape.

The object (104) includes one or more sections (110). The sections (110) are portions of the object (104) (or the surface of the object (104)) defined by one or more boundaries (112) defined for the coated object. The boundaries may be represented by the physical boundaries of prominences or sub-areas of the object (or the surface of the object) or may be virtual boundaries that are added to the three-dimensional scan (102). An example of the sections (110) is shown in FIG. 3.1 and FIG. 3.2.

In a simplified example, consider a cylindrical drill bit having a coated facing surface, circular in shape, that is intended to drill into the Earth. In this example, the shape (108) is a combination of the surface shape of the surface of the cylindrical drill bit combined with a coating shape of the coating on the surface. In this example, the sections (110) may be virtual boundaries that divide the coated facing surface into a series of pie wedges. Each pie wedge represents one section. In combination, the set of pie wedges forms the sections (110) of the object (104) as stored in the three-dimensional scan (102). The boundaries (112) are the boundaries of the pie wedges.

The three-dimensional scan (102) may not be suitable for input to a machine learning model (136), at least with respect to determining whether the coating profile of the coating (106) is within the engineering tolerance at various points along the surface of the coating (106) or object (104). One reason for this issue is that there are too many points on the surface in order for the machine learning model (136) to generate a prediction (124) in a reasonable amount of time given possibly limited computational resources of the processor (132). Another reason is that any resulting coating profile (defined below) may be too complex for application to the object (104). However, the method of FIG. 2 may be used to address this technical issue and permit the machine learning model (136) to generate one or more mathematically optimized thickness predictions for the sections (110)

of the object (104). Alternatively, the machine learning model (136) may scan an existing object (104) that is coated, and then predict whether the coating (106) at any of the sections (110) of the object (104) is within the engineering tolerance. The object (104) or the coating (106) may then be reworked accordingly, as described with respect to FIG. 2.

Attention is returned to the data repository (100). The data repository (100) also may store flattened data (114). The flattened data (114) is data that results when a mapping has transformed the three-dimensional scan (102). An example of the mapping may be UV mapping, which is described with respect to FIG. 2. The letters "U" and "V" in "UV mapping" denote the "U" and "V" axes of a two dimensional image, because the letters "X," "Y," and "Z" were already used to denote the axes of a three dimensional object in a model space. Briefly, UV mapping projects a three dimensional model's surface onto a two dimensional image for texture mapping.

However, other mappings may be used. Thus, the flattened data (114) is not necessarily a two dimensional projection from the three-dimensional scan (102). The flattened data (114) may be some other mapping or transformation of the three-dimensional scan (102).

The flattened data (114) may be sorted with respect to the sections (110) defined for the object (104). Thus, the flattened data (114) may be organized into a layout (116) that includes multiple zones, such as Zone A (118) and Zone B (120). Each of the zones may represent one of the sections (110), though it is possible to define a zone as including two or more of the sections (110). It is also possible to define one or more of the zones as including one or more portions of one or more of the sections (110).

Thus, a zone can be any portion of the flattened data (114), whereby the collection of zones defines a layout (116). Stated differently, the zones are organized into the layout (116). The layout (116) also may be described as an arrangement, either logical or visible (when rendered as an image), of the zones. Thus, the Zone A (118) and the Zone B (120) have a particular arrangement, and that particular arrangement is the layout (116). An example of both the layout (116) and the zones is shown in FIG. 4.

Figure 4:
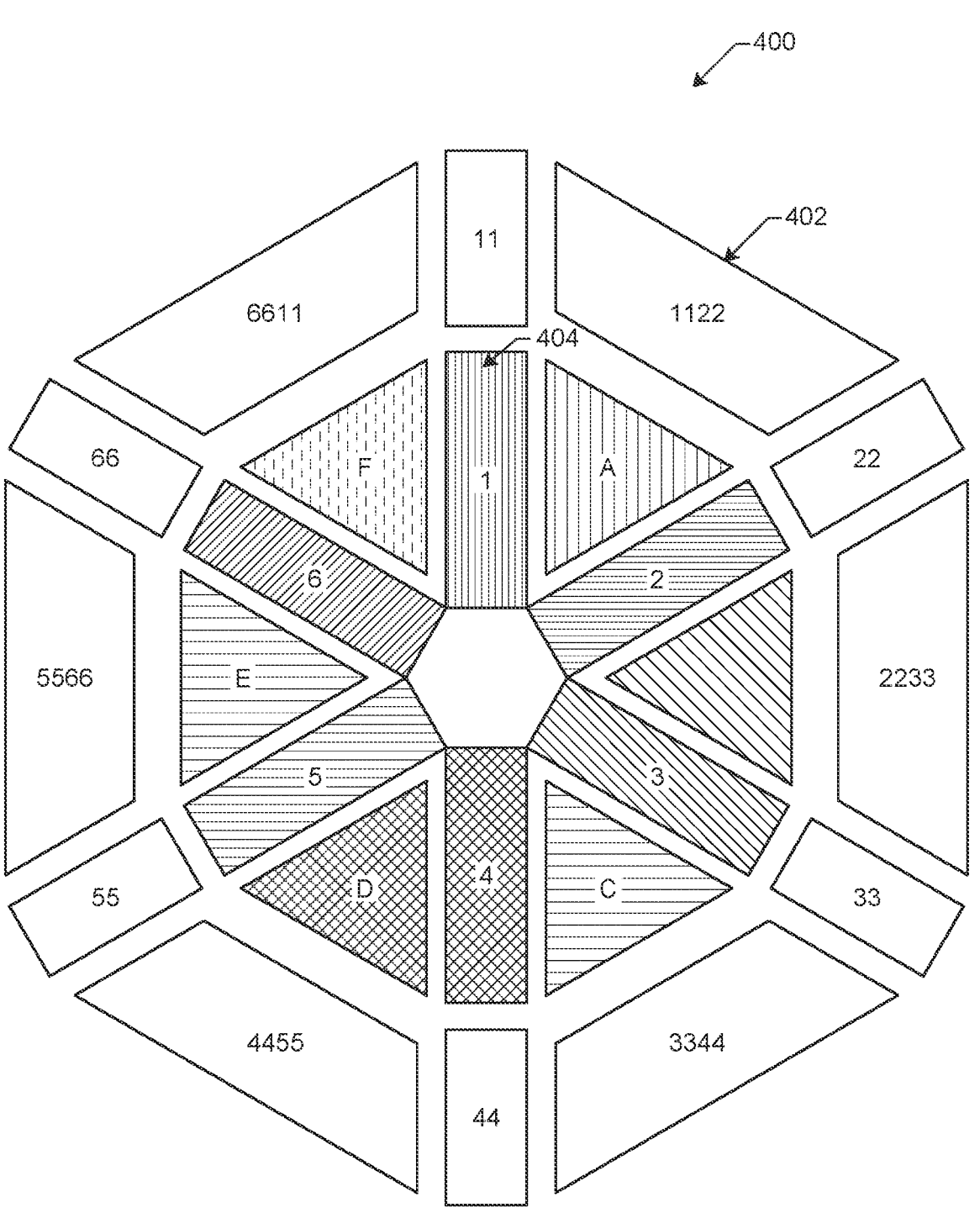
FIG. 4 shows a flattened, pre-processed data set composed from a scanned three-dimensional thickness coating profile, in accordance with one or more embodiments.

Note that the layout (116) may not be a two dimensional arrangement of zones, such as shown in FIG. 4. It is possible to arrange the layout (116) in a three-dimensional arrangement of zones. It is also possible to nest zones within each other, thereby logically defining a hyperdimensional object of four or more dimensions.

The data repository (100) also stores a vector data structure (122). The vector data structure (122) is a computer-readable data structure defined as a matrix having a predefined dimensionality. While the matrix may have two or more dimensions, in many cases the vector data structure (122) is an "N" by 1 dimensional matrix, where "N" is a predetermined number.

The vector data structure (122) is characterized by features and values. A feature is a data type of interest, such as for example the presence or absence of a physical property, a thickness value, a measurement for a physical dimension, etc. A value is a value for the feature as represented by a number. Thus, the vector data structure (122) has "N" features and a corresponding number of values for the "N" features. The values for the "N" features may be logically stored in the "N" by one dimensional matrix.

The process of generating the vector data structure (122) is known as vectorization. The process of vectorization is described with respect to FIG. 2.

The data repository (100) also may store a prediction (124). The prediction (124) is the output of a machine learning model, such as the machine learning model (136) defined below. The prediction (124) may be an output vector, in some cases. The output vector stores output values that represent predictions made by the machine learning model based on the vector data structure (122). However, the prediction (124) may be a single number or other prediction regarding an overall evaluation performed by the machine learning model based on the vector data structure (122).

In one or more embodiments, the prediction (124) may be a set of predictions made for the zones, such as the Zone A (118) and the Zone B (120). Thus, the prediction (124) may refer to a set of predictions, one for the Zone A (118) and one for the Zone B (120).

The data repository (100) also may store training data (126). The training data (126) is data for which the final predicted value is known. The training data (126) is used to train a machine learning model, using the training controller (138) shown in FIG. 1.2 using the training technique described with respect to FIG. 1.2.

For example, the training data (126) may be the flattened data (114) taken for an object for which the various values for an optimized coating profile of the coating (106) are known. In other words, it is known what a first coating thickness should be for the Zone A (118) and what a second coating thickness should be for the Zone B (120). The corresponding thicknesses of the two zones represent labels. Thus, the training data (126) may be considered labeled data. The use of labeled data with respect to machine learning training is described with respect to FIG. 1.2.

The data repository (100) also may store augmented training data (128). Because the accuracy of prediction of a machine learning model may be improved by having more data available, it may be desirable to add to the training data (126). The combination of the added data and the training data (126) is the augmented training data (128).

The process of augmenting the training data (126) to become the augmented training data (128) is described with respect to FIG. 2. However, briefly, three-dimensional data for virtual coated objects may be generated, flattened into the flattened data (114), and then deliberately labeled. The labels could be "in tolerance," "above tolerance," or "below tolerance" for each of the zones of the layout (116) for the virtual coated object.

The system shown in FIG. 1.1 may include other components. For example, the system may include a server (130). The server (130) is one or more computers, possibly operating in a distributed computing environment via a network. An example of the one or more computers that constitute the server is shown in FIG. 5.1. An example of the network is shown in FIG. 5.2.

The server (130) may include a processor (132). The processor (132) is a hardware or virtual processor which may execute computer readable software or implement application specific hardware functions. An example of the processor (132) is shown in FIG. 5.1.

The server (130) also includes a server controller (134). The server controller (134) is one or more software programs or application specific hardware which, when executed by the processor (132), execute the methods described herein, such as the method of FIG. 2. Thus, for example, the server controller (134) may control the receipt of the three-dimensional scan (102) from the scanning device (140), flatten the data to generate the flattened data (114), etc.

The server controller (134) includes a machine learning model (136). The machine learning model (136) is a computer program that can recognize patterns in data or make predictions based on input data. The machine learning model (136) may be a neural network, a reinforcement learning model, a logistic regression model, or some other type of machine learning model. Specific machine learning models that may be used for the machine learning model (136) are described with respect to FIG. 4. Note that the machine learning model (136) may refer to multiple machine learning models, such as a machine learning model ensemble.

The server (130) also may include a training controller (138). The training controller (138) is one or more software programs or application specific hardware which, when executed by the processor (132), train the machine learning model (136). The training controller (138) is described in more detail with respect to FIG. 1.2.

The system shown in FIG. 1.1 may include other components. For example, the system may include a scanning device (140). The scanning device (140) is a device capable of measuring the object (104) to produce the three-dimensional scan (102). An example of the scanning device (140) may be a camera, a laser measuring device, etc.

The system shown in FIG. 1.1 also may include a tool (142). The tool (142) may be controlled by the server controller (134) of the server (130) to perform a physical operation on the object (104). Thus, for example, the tool (142) may be used to rework the object (104), the coating (106), or a combination of both the object (104) and the coating (106). As used herein, the term "rework" means to physically alter, in at least one of the sections (110), at least one aspect of at least one of the shape (108) or the coating (106) of the object (104).

For example, the tool (142) may be a lathe that removes material from the object (104). In another example, the tool (142) may be a molecular beam epitaxy device that adds the coating (106) to one or more of the sections (110) of the object (104), with potential molecule by molecule precision. In still another example, the tool (142) may be a robot and a bath that stores a liquid state of the coating (106). In this case, the robot may dip one or more of the sections (110) of the object (104) into the bath in order to apply the coating (106) to the object (104). Many other tools are contemplated.

The system shown in FIG. 1.1 may be connected to, or include, one or more user devices. The user devices may be used to direct the operation of the scanning device (140), the tool (142), the server controller (134), or the training controller (138), or to access any of the information in the data repository (100). The user devices may include one or more user input devices and one or more display devices to interact with the system.

Attention is turned to FIG. 1.2, which shows the details of the training controller (138). The training controller (138) is a training algorithm, implemented as software or application specific hardware, that may be used to train one or more of the machine learning models described with respect to the computing system of FIG. 1.1.

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model is applied to the vector data structure (122) of FIG. 1.1 in order to make predictions.

In more detail, training starts with training data (176), which may be the training data (126) defined with respect to FIG. 1.1. The training data (176) is data for which the final result is known with certainty. For example, if the machine learning task is to identify whether two names refer to the same entity, then the training data (176) may be name pairs for which it is already known whether any given name pair refers to the same entity.

The training data (176) is provided as input to the machine learning model (178). The machine learning model (178) may be characterized as a program that has adjustable parameters. The program is capable of learning and recognizing patterns to make predictions. The output of the machine learning model may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

One or more initial values are set for the parameter (180). The machine learning model (178) is then executed on the training data (176). The result is an output (182), which is a prediction, a classification, a value, or some other output which the machine learning model (178) has been programmed to output.

The output (182) is provided to a convergence process (184). The convergence process (184) is programmed to achieve convergence during the training process. Convergence is a state of the training process, described below, in which a pre-determined end condition of training has been reached. The pre-determined end condition may vary based on the type of machine learning model being used (supervised versus unsupervised machine learning) or may be pre-determined by a user (e.g., convergence occurs after a set number of training iterations, described below).

In the case of supervised machine learning, the convergence process (184) compares the output (182) to a known result (186). The known result (186) is stored in the form of labels for the training data. For example, the known result for a particular entry in an output vector of the machine learning model may be a known value, and that known value is a label that is associated with the training data.

A determination is made whether the output (182) matches the known result (186) to a pre-determined degree. The pre-determined degree may be an exact match, a match within a pre-specified percentage, or some other metric for evaluating how closely the output (182) matches the known result (186). Convergence occurs when the known result (186) matches the output (182) to within the pre-determined degree.

In the case of unsupervised machine learning, the convergence process (184) may be to compare the output (182) to a prior output in order to determine a degree to which the current output changed relative to the immediately prior output or the original output. Once the degree of change fails to satisfy a threshold degree of change, then the machine learning model may be considered to have achieved convergence. Alternatively, an unsupervised model may determine pseudo labels to be applied to the training data and then achieve convergence as described above for a supervised machine learning model. Other machine learning training processes exist, but the result of the training process may be convergence.

If convergence has not occurred (a "no" at the convergence process (184)), then a loss function (188) is generated. The loss function (188) is a program that adjusts the parameter (180) (one or more weights, settings, etc.) in order to generate an updated parameter (190). The basis for performing the adjustment is defined by the program that makes up the loss function (188) but may be a scheme that attempts to guess how the parameter (180) may be changed so that the next execution of the machine learning model (178) using the training data (176) with the updated parameter (190) will have an output (182) that is more likely to result in convergence (e.g., that the next execution of the machine learning model (178) is more likely to match the known result (186) (supervised learning), or which is more likely to result in an output that more closely approximates the prior output (one unsupervised learning technique), or which otherwise is more likely to result in convergence.

In any case, the loss function (188) is used to specify the updated parameter (190). As indicated, the machine learning model (178) is executed again on the training data (176), this time with the updated parameter (190). The process of execution of the machine learning model (178), execution of the convergence process (184), and the execution of the loss function (188) continues to iterate until convergence.

Upon convergence (a "yes" result at the convergence process (184)), the machine learning model (178) is deemed to be a trained machine learning model (192). The trained machine learning model (192) has a final parameter, represented by the trained parameter (194). Again, the trained parameter (194) shown in FIG. 1.2 may be multiple parameters, weights, settings, etc.

During deployment, the trained machine learning model (192) with the trained parameter (194) is executed again, but this time on the vector data structure (122) of FIG. 1.1 for which the final result is not known. The output of the trained machine learning model (192) is then treated as a prediction of the information of interest relative to the unknown data.

While FIG. 1.1 and FIG. 1.2 shows a configuration of components, other configurations may be used without departing from the scope of one or more embodiments. For example, various components may be combined to create a single component. As another example, the functionality performed by a single component may be performed by two or more components.

FIG. 2 shows a flowchart of a method for evaluating a coating of an object, in accordance with one or more embodiments. The method of FIG. 2 may be implemented using the system shown in FIG. 1.1 and FIG. 1.2.

Step 200 includes receiving a three-dimensional scan of a coating that coats an object. Again, the coating and the object, in combination, have a shape that is measured and stored as data in the three-dimensional scan.

The receipt of the three-dimensional scan may be performed using a variety of different techniques. For example, a camera may take a three-dimensional image of the object, convert the three dimensional image to digital data, and then store the digital data as a three-dimensional scan. The three-dimensional scan may be present already in a data repository, in which place the processor may request or be provided with the three-dimensional scan. The three-dimensional scan may be obtained using a laser or set of lasers that measure the three-dimensional shape of the object. The time of flight of the laser light may be measured and the distances traveled by the laser light determined from the time of flight. The distance may be used to determine the shape of the object. Still other techniques for measuring or otherwise receiving the three-dimensional scan may be used.

Step 202 includes flattening the three-dimensional scan to generate flattened data. Briefly, flattening includes conforming scan data in the three-dimensional scan to zone data for a set of zones of a layout. The set of zones represents one or more sections of the shape cut along two or more boundaries in the shape. Each of the zones represents a corresponding thickness of the coating in a corresponding section of the one or more sections.

The process of flattening may be performed by a variety of different methods. For example, the three-dimensional scan may be projected into a two-dimensional layout (or a higher-dimensional layout) using UV mapping or other photogrammetry techniques.

UV mapping is a three-dimensional modeling process of projecting a three-dimensional model's surface to a two-dimensional image for texture mapping. Again, the letters "U" and "V" denote the axes of the two-dimensional texture because "X", "Y", and "Z" are already used to denote the axes of the three-dimensional object in model space. Unless otherwise specified, the term "UV mapping" and "UV map," as used herein, comply with the standard definitions used in the art of three dimensional modeling processes.

UV texturing permits polygons that make up a three-dimensional object to be painted with color or other highlighting (and other surface attributes) from an ordinary image. The image is called a UV texture map, which in one or more embodiments is the layout. The UV mapping process may involve assigning pixels in the image to surface mappings on the polygon by copying a triangular (or other polygon) piece of the image map and pasting a piece of the image map onto a triangle on the object.

However, flattening may be performed using other techniques as well. For example, projection mapping (e.g., using a pair of the X, Y, and Z coordinates in the three-dimensional scan, or some other transformation of the position) may be used. Projection mapping maps the three-dimensional scan into a texture space, rather than into the geometric space of the object. The rendering computation may use the UV texture coordinates to determine how to paint the three-dimensional surface.

Regardless of how the flattening is performed, what results is a layout having one or more zones. Each zone may include data derived from the three-dimensional scan that defines the thickness of the coating (or the dimensions of protrusions or indentations in the object). Thus, each zone may then be analyzed (in step 206, below) to determine whether each zone satisfies an engineering tolerance, or is outside the engineering tolerance.

The flattened data may be stored in one or more zones of a layout. Each zone may represent one section of the one or more sections of the object. Again, each of the sections may represent a portion of the surface of the object defined by boundaries defined for the surface of the object.

Step 204 includes vectorizing the flattened data into a vector data structure. Vectorization is a process of converting the data in the zones of the layout into the vector data structure. For example, the data in each zone may be mapped to an "N" by one dimensional matrix where features represent types of data in the zone and values represent the values of the features.

In the case of multiple zones, the vector data structure may be a concatenation of each of the individual vector data structures generated for each individual zone. In other words, the individual vector data structures are concatenated to generate a single vector of dimensionality "M" by one, where "M" is greater than "N."

Alternatively, the vector may be a two dimensional "N" by "M" matrix, where "N" is the number of features and "M" represents each of the individual vectors. Still other variations of vectorization are possible, as the type of machine learning model selected for the prediction process at step 206 may influence the type of vector that may be used as input to the machine learning model. For example, some machine learning models may use an "M" by one dimensional matrix, and others may use vectors having different data structures.

Step 206 includes generating a prediction whether one or more zones of the zones are out of an engineering tolerance for the coating. Generating the prediction may be performed by a machine learning model that takes, as input, the vector data structure, and produces, as output, the prediction.

The specific process of generating the prediction depends on the type of machine learning model used for the prediction. For example, a neural network may pass the vector data structure through an input layer, a set of hidden layers, and then an output layer. The neural network layers may model connections of nodes in the hidden layers as weights between the nodes. Weighting may influence the algorithm. A positive weight reflects an excitatory connection, while a negative weight reflects inhibitory connections. One or more of the inputs may be modified by a weight and summed. An activation function may control the amplitude of the output. For example, an acceptable range of output may be a number between 0 and 1 or may be between −1 and 1. For example, the output may represent the prediction, with a zone predicted to be inside the engineering tolerance (an output of 0), below the engineering tolerance (an output of −1), or above the engineering tolerance (an output of 1).

In the case of generating the prediction using a reinforcement learning machine learning model, a group of N-tuple vectors may be established by assigning, for each of the groups of zones, one of the N-tuple vectors to a corresponding zone of the group of zones. Each of the N-tuple vectors represents potential statuses of the coating in a corresponding section of the shape. Weighted N-tuple vectors may be generated by weighting the N-tuple vectors to favor or penalize at least one of the potential statuses. The weighted N-tuple vectors may be used for a reward computation function of the reinforcement learning model when the reinforcement learning model is executed at step 206.

Other machine learning model techniques may be used at step 206. For example, the example of FIG. 4 describes additional details for the use of both a neural network machine learning model and a reinforcement learning machine learning model.

In an embodiment, the method of FIG. 2 may terminate after step 206. However, the method of FIG. 2 may be extended or modified.

For example, in an embodiment, the method of FIG. 2 also may include generating sections along the boundaries in the shape. The method of FIG. 2 contemplates the possibility that the three-dimensional scan is already available. In this case, the sections and boundaries may also already be available as well. Thus, when the sections have not already been generated, th e method may be extended to include generating the sections along the boundaries in the shape.

In another embodiment, the method of FIG. 2 also may include generating the layout from the sections. Again, the method of FIG. 2 contemplates the possibility that the three-dimensional scan is already available, and thus the layout may also be available as well. Thus, when the layout has not already been generated, the method may also include the step of generating the layout.

In another embodiment, the method of FIG. 2 also may include presenting the zones as a heatmap. An example of a heatmap is shown in FIG. 4. The heatmap may be presented by coloring or otherwise using a highlighting scheme to indicate which of the zones are inside or outside the engineering tolerance. The heatmap may be presented by displaying the heatmap on a display device of a user's computer, or may be presented by storing the heatmap for use by some other software process.

As indicated above, the flattened data may be stored in a layout. Thus, in an embodiment, the layout may be a two-dimensional image showing the zones. In this case, flattening conforms the three-dimensional scan to a two dimensional image. However, in the other embodiments, the layout may be a three-dimensional (or, by nesting zones, a higher-dimensional image). In this case, flattening conforms the three-dimensional scan to a three-dimensional image (or a higher dimensional image shown by nesting groups of zones). In this case, flattening conforms the three-dimensional scan to the three-dimensional image (or the higher dimensional image).

Still other variations of the method of FIG. 2 are possible. For example, in an embodiment, the method of FIG. 2 may include reworking the object based on the prediction. Reworking the object may include using a tool to physically alter the object, such as by removing material, adding material, or otherwise modifying the object. The tool may be controlled to physically alter the object so that the object comes into compliance with the desired engineering tolerances for the one or more zones. Thus, for example, if a prediction for a zone indicates that the zone is out of tolerance, then the corresponding section of the object may be reworked in order to bring the section of the object within the engineering tolerance.

Similarly, the method of FIG. 2 may include reworking the coating based on the prediction. Reworking the coating may include using a tool to physically alter the coating, such as by removing material, adding material, or otherwise modifying the coating. The tool may be controlled to physically alter the coating so that the coating comes into compliance with the desired engineering tolerances for the one or more zones. Thus, for example, if a prediction for a zone indicates that the zone is out of tolerance, then the corresponding section of the coating may be reworked in order to bring the section of the coating within the engineering tolerance.

In another embodiment, reworking may include reworking both the object and the coating. Still other variations of physically transforming the object, the coating, or both, are possible.

In another embodiment, the method of FIG. 2 may include generating training data by labeling each of the zones with a corresponding status of the coating in the each of the zones. For example, if the status of various portions of a previously measured coating profile is known, then the flattened data may be labeled as being inside or outside the engineering tolerance on a zone by zone basis. The training data then may be used to train the machine learning model, as described with respect to FIG. 1.2.

In another embodiment, the method also may include generating augmented data. Generating the augmented data may include generating simulated scans of virtual coatings that virtually coat virtual objects defined by a human technician or automatically by a computer process. Then, the simulated scans may be flattened to generate flattened simulated data including simulated layouts having groups of virtual zones representing virtual sections of virtual shapes of the virtual objects. Then, groups of virtual statuses may be assigned to the groups of simulated virtual zones. In this case, the augmented data may be the simulated layouts together with the groups of virtual statuses. The augmented data may be added to the training data to generate augmented training data. Then, the machine learning model may be trained, iteratively until convergence, with the augmented training data, as described with respect to FIG. 1.2.

The statuses mentioned above may be defined with respect to the engineering tolerance. For example, the corresponding status for each zone may be one of: satisfies the engineering tolerance, is below the engineering tolerance, and is above the engineering tolerance. Similarly, each of the groups of virtual statuses for each of the virtual zones may be one of: satisfies the engineering tolerance, is below the engineering tolerance, and is above the engineering tolerance.

While one or more embodiments may include improved machine learning assessment of autonomous drill bit hard face quality, other embodiments contemplate performing a similar technique on other objects having other coatings. Still other embodiments contemplate performing a similar technique on objects without coatings, in which case the technique is applied to compare the shape of the object with respect to a reference shape. The method of FIG. 2 is applicable to each of these embodiments.

Finally, in another variation to the method of FIG. 2, it may be possible to directly use the three dimensional model to predict whether various areas of the coating on the object (or the shape of the object itself) are within an engineering tolerance. For example, the three-dimensional model of the object may be applied to a neural network trained to process three-dimensional point clouds. In this case, the scanned data of the three-dimensional data take the form of point clouds.

Each point in the point cloud may have a position in three-dimensional space specified as "X," "Y," and "Z" coordinates. A distance to the nearest point on the desired surface, calculated as a point-to-point distance or point-to-plane distance, can be used as a fourth coordinate. Hence, a point in the point cloud becomes (x, y, z, h) where "h" represents the height above the point in the surface. The height "h" can be positive, zero, or negative. Any conversion of "h" to a color value also can be used.

The neural network is then trained on identifying whether each point in the point cloud of the scanned data is "within tolerance" or "outside tolerance." With a sufficient simple data set, the neural network can learn which areas of the object or coating are of greater interest or more sensitive to variation in coating thickness, and which can tolerate more of a variation in coating thickness. Thus, at inference time, an accurate determination can be made whether areas on the coating of the object, or the surface of the object itself, are within tolerance or outside tolerance.

The output of the neural network is an output vector that describes whether each cloud point is within or outside the engineering tolerance. From the output vector, points that are out of tolerance may be highlighted on a three-dimensional image of the object.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

FIG. 3.1, FIG. 3.2, and FIG. 4 show an example of an improved machine learning assessment of autonomous drill bit hard face quality, in accordance with one or more embodiments. The following example is for explanatory purposes and is not intended to limit the scope of one or more embodiments.

FIG. 3.1 shows an example of a coating profile (300) of a coating disposed on a drill bit (302), in accordance with one or more embodiments. FIG. 3.2 shows an example of a coating profile (301) of a coating disposed on a drill bit (303), in accordance with one or more embodiments.

For both FIG. 3.1 and FIG. 3.2, the highlighting variations shown in the corresponding legend (i.e., legend (304) in FIG. 3.1 and legend (305) in FIG. 3.2) indicate coating thickness or coating type (or a combination of thickness and coating type) on various areas of the drill bit (i.e., the drill bit (302) in FIG. 3.1 and the drill bit (303) in FIG. 3.2).

Note that the highlighting shown in FIG. 3.1 or FIG. 3.2 does not necessarily indicate whether the thickness of the coating is within an acceptable engineering tolerance for a particular section of the drill bit. For example, while a red area may indicate a thicker coating, it may be expected for a particular coating profile that the thickness of the coating in a red zone should be thicker, relative to other areas on the face of the drill bit. The question, in this case, is whether the thickness in the red area is "thick enough" or "too thick" relative to the engineering tolerances for a specified red area for the particular drill bit in question, possibly for a particular planned drilling operation. In other words, the coating profile may vary by the type of drill bit, the application to which the drill bit may be placed, the material used for the drill bit, the coating used, the location of a particular sub-area (i.e., section) of the face of the drill bit, and perhaps many other possible variables.

Turning again to FIG. 3.1 and FIG. 3.2, shown are laser scans of the faces of two drill bits (i.e., drill bit (302) of FIG. 3.1 and drill bit (303) of FIG. 3.2). In the example shown, a highlighting-coding scheme is used to denote which areas are below or above the target thickness, as indicated by the corresponding legends (i.e., legend (304) of FIG. 3.1 and legend (305) of FIG. 3.2).

A set of rules may exist, based on available data, that may be used to decide whether the drill bit is to be reworked, or if the drill bit is ready for service in a drilling operation. The decision desirably is to be made correctly the first time, as excessive reworking may involve reheating the bit and the extra time taken to allow the drill bit to be cooled before the drill bit can be rescanned.

One or more embodiments use a neural network to classify and identify zones of flattened data in order to classify the corresponding sections on the hard facing surface of the drill bit. The resulting comparison report may be generated by doing a distance computation of what the coating profile should be, versus where the coating profile is.

For example, if one were attempting to coat a sphere with a coating of a material of 0.01 inch, one would first apply the coating, and then scan the object to obtain a digital mesh representation. One would also take the digital CAD model of the original shape and apply a digital offset to the surface of the sphere to obtain a larger shape that would be 0.01 inch greater in radius than the original shape.

One would then overlay the scanned sphere digital representation over an offset computer assisted drawing (CAD) model representation. One would then find points on the scanned model and find a nearest point on the CAD model. One would use the signed distance at each of those points to highlight the point appropriately. Depending on the sensitivity scale some points might be "Red", "Green," or "Blue" or some other highlighting scheme, such as shown in FIG.

3.1 and FIG. 3.2. The highlighting shown on the drill bits represents the measured (or predicted) thickness of the coating at various sections on the hard facing surface of the drill bit.

FIG. 4 shows an example of a layout (400). The layout (400) includes a number of zones, such as zone (402) and zone (404). The zone (404) is highlighted as shown in FIG. 4, representing in this particular example that the thickness of the coating on a scanned drill bit is above an engineering tolerance for the corresponding section on the drill bit hard facing.

The layout (400) stores flattened data, pre-processed by the method of FIG. 2. The flattened data set may be generated from a scanned three-dimensional thickness coating profile. The flattening process may be used to permit the use and training of the machine learning model. By generating improved training data, the machine learning model may be improved by means of an improved training process. Thus, a result of one or more embodiments is an improved machine learning model.

An initial step of one or more embodiments is to flatten out the three-dimensional model with highlighting into a two-dimensional layout. For example, polycrystalline diamond cutter (PDC) drill bits have a certain structure and shape. There are blades with cutters and body areas in between the blades. There are several techniques one may use to map a three-dimensional to a two-dimensional shape. One technique is to make cuts in the shape along certain natural boundaries in the shape. The diagram in FIG. 4 shows these natural boundaries.

Once the cuts are made, one or more embodiments map the sections in three-dimensional scan onto the layout (400) in a two-dimensional, as shown in FIG. 4. As shown, the 6-blade drill bit shown in FIG. 3.1 and FIG. 3.2 includes 25 specific zones in the layout (400) of FIG. 4. Each zone maps to a three-dimensional section on the drill bit.

With respect to training the machine learning model, one or more embodiments may use an "active-learning" approach to reduce the amount of labeling applied for a particular application. In this approach, one or more embodiments may continuously evaluate the neural network for a mean average precision. Once the desired precision is achieved, labeling is deemed sufficient. Picking diverse and more ambiguous input images helps achieve a faster convergence. A combination of technical expert labeling of images and synthetic datasets may be used to curate or generate such a diverse set of labels.

Another way to train the network is to use a representative three-dimensional CAD model that can be reused for an entire class of drill bits with a similar number of blades. One or more embodiments may produce multiple renderings of this three-dimensional model from various selected angles. Using this approach may produce multiple layouts, instead of a single layout, one or more of which may be used to train the machine learning model.

While one or more embodiments illustrate this methodology for drill bits, one or more embodiments could be generalized over several shapes with similar topology. Thus, one or more embodiments may be applied to coating profiles in a variety of different applications. One or more embodiments also may be applied to precision machining operations, where shapes having tight engineering tolerances are added to an object, or subtracted from an object. Thus, in addition to the additive process in which coating is added to an object, one or more embodiments also may be used with respective to subtractive processes that remove coating material, such as etching, sanding, shaving, scraping, etc.

Thus, one or more embodiments improve the pre-processing of data in order to enable a machine learning model to characterize complex coating profiles and determine whether a particular coating is out of engineering tolerance in one or more sub-areas or zones of the object being coated. As explained above, one or more embodiments may automate a quality control process to a degree. One or more embodiments may also remove subjectivity in the decision making and improve the efficiency of quality control procedures for coating drill bits.

One or more embodiments also may be used to offer real time collaboration with field technicians and engineers, by analyzing a coating during a drilling operation. Once the coating profile is out of tolerance in a pre-determined number of zones, or in particular selected zones, then the drilling operation may be suspended in order to switch drill bits and return the used drill bit for rework. In addition, drill bit life may be extended using one or more embodiments because the conditions of drilling could be modified as drilling continues, based on the measured physical properties of the drill bit and the effect of the properties on the drill bit coating thickness.

Additionally, the manufacturing process may be performed more quickly. For example, a scan may be performed immediately after rework and before a drill bit is cooled after a coating operation. If rework is to be performed to bring the coating profile into engineering tolerances, such rework may be performed before the drill bit is cooled, thereby saving on the number of heating and cooling operations performed during a coating procedure.

One or more embodiments may improve drill bit manufacturing time by 2-4 days. One or more embodiments also permit quality control experts that can perform other activities to perform other duties.

One or more embodiments may address a number of technical objectives. For example, one or more embodiments improve a machine learning model by improving the training data used to train a machine learning model. One or more embodiments also improve a machine learning model by providing data in a data format that is more conducive to the operation of the machine learning model. One or more embodiments also may be used to control manufacturing processes, such as coating drill bits. One or more embodiments also may be used to control drilling operations by controlling how and when drilling should be modified or stopped in order to change drill bits or increase the life of the coating of a drill bit.

One or more embodiments may be combined with other photogrammetry techniques. For example, when using the quantification method for three-dimensional reconstruction purposes, the redundancy of coverage provided by using one or more embodiments together with the other photogrammetry techniques may be useful. For photogrammetry reconstruction, a full reconstruction may be performed using captured data. The results may be compared with a CAD model or another reference to ensure or improve the quality of characterization of the coating on the drill bit.

Based on the description above, one or more embodiments include a method. The method includes receiving a scan of a coating profile of a coating that coats an object. The method also includes flattening the scan to generate flattened data. The method also includes inputting the flattened data into a machine learning model. The method also includes outputting, by the machine learning model, a prediction whether one or more zones of the object are out of engineering tolerances for the coating in the one or more zones.

One or more embodiments also provide for a method of training a machine learning model. The method includes receiving a scan of a coating profile of a coating that coats an object. The method also includes generating training data by labeling the coating profile to indicate whether zones on the object have sub-areas of coating that are within engineering tolerances for the sub-areas. The method also includes augmenting the training data to generate augmented data. Augmenting includes generating synthetic data including additional simulated scans of coating profiles of additional coatings that coat objects differently than the object. The additional simulated scans are labeled to indicate zones that are inside or outside of engineering tolerances. The method also includes adding the synthetic data to the training data. The method also includes training a machine learning model using the augmented data. The machine learning model is trained to predict whether a new coating profile on a new object includes new zones that are inside or outside of engineering tolerances.

One or more embodiments may be implemented on a computing system specifically designed to achieve an improved technological result. When implemented in a computing system, the features and elements of the disclosure provide a technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 5.1, the computing system (500) may include one or more computer processor(s) (502), non-persistent storage device(s) (504), persistent storage device(s) (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores or micro-cores of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (508). The inputs may include text input, audio input, video input, etc., which may be processed and transmitted by the computing system (500) in accordance with one or more embodiments. The communication interface (512) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (508) may include a display device, a printer, external storage, or any other output device. One or more of the output devices may be the same or different from the input device(s) (510). The input and output device(s) may be locally or remotely connected to the computer processor(s) (502). Many different types of computing systems exist, and the aforementioned input and output device(s) may take other forms. The output device(s)

(508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5.1. Further, the client device (526) may include or perform at least some of one or more embodiments.

The computing system of FIG. 5.1 may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited by the attached claims.

What is claimed is:

1. A method comprising:
receiving a three-dimensional scan of a coating that coats an object, wherein the coating and the object, in combination, have a shape;
flattening the three-dimensional scan to generate flattened data, wherein:
flattening comprises conforming scan data in the three-dimensional scan to zone data for a plurality of zones of a layout,
the plurality of zones represents a plurality of sections of the shape cut along a plurality of boundaries in the shape, and
each of the plurality of zones represents a corresponding thickness of the coating in a corresponding section of the plurality of sections;
vectorizing the flattened data into a vector data structure; and
generating a prediction whether one or more zones of the plurality of zones are out of an engineering tolerance for the coating, wherein the generating the prediction is performed by a machine learning model that takes, as input, the vector data structure and produces, as output, the prediction.

2. The method of claim 1, further comprising:
generating the plurality of sections along the plurality of boundaries in the shape.

3. The method of claim 2, further comprising:
generating the layout from the plurality of sections.

4. The method of claim 1, further comprising:
presenting the plurality of zones as a heatmap.

5. The method of claim 1, wherein:
the layout comprises a two-dimensional image showing the plurality of zones, and
flattening conforms the three-dimensional scan to the two-dimensional image.

6. The method of claim 1, wherein:
the layout comprises a three-dimensional image having the plurality of zones, and
flattening conforms the three-dimensional scan to the three-dimensional image.

7. The method of claim 1, wherein:
each zone of the plurality of zones represents one section of the plurality of sections, and
each of the plurality of sections represents a portion of a surface of the object.

8. The method of claim 1, further comprising performing at least one of:
reworking the object based on the prediction; and
reworking the coating based on the prediction.

9. The method of claim 1, wherein the object comprises a drill bit and the coating is on a facing surface of the drill bit.

10. The method of claim 1, further comprising:
generating training data by labeling each of the plurality of zones with a corresponding status of the coating in each of the plurality of zones;
generating augmented data, wherein generating the augmented data comprises:
generating a plurality of simulated scans of virtual coatings that virtually coat a plurality of virtual objects,
flattening the simulated scans to generate flattened simulated data comprising a plurality of simulated layouts having pluralities of virtual zones representing virtual sections of virtual shapes of the plurality of virtual objects, and
assigning pluralities of virtual statuses to the pluralities of simulated virtual zones,
wherein the augmented data comprises the plurality of simulated layouts together with the pluralities of virtual statuses;
adding the augmented data to the training data to generate augmented training data; and
training, iteratively until convergence, the machine learning model with the augmented training data.

11. The method of claim 10, wherein:
the corresponding status comprises one of: satisfies the engineering tolerance, is below the engineering tolerance, and is above the engineering tolerance, and
each of the pluralities of virtual statuses comprises one of: satisfies the engineering tolerance, is below the engineering tolerance, and is above the engineering tolerance.

12. A system comprising:
a data repository for storing a three-dimensional scan of a coating that coats an object, wherein the coating and the object, in combination, have a shape; and
a processor in communication with the data repository and programmed to:
flatten the three-dimensional scan to generate flattened data, wherein:
flattening comprises conforming scan data in the three-dimensional scan to zone data for a plurality of zones of a layout,
the plurality of zones represents a plurality of sections of the shape cut along a plurality of boundaries in the shape, and each of the plurality of zones represents a corresponding thickness of the coating in a corresponding section of the plurality of sections;

vectorize the flattened data into a vector data structure; and execute a machine learning model, wherein:

the machine learning model takes, as input, the vector data structure and produces, as output, a prediction whether one or more zones of the plurality of zones are out of an engineering tolerance for the coating.

13. The system of claim 12, further comprising:

a scanning device configured for scanning the coating to generate the three-dimensional scan; and a tool configured to rework at least one of the coating and the object when at least one of the plurality of zones is out of the engineering tolerance.

14. A method comprising:

receiving a three-dimensional scan of a coating that coats an object, wherein:

the three-dimensional scan comprises a point cloud, each point in the point cloud is expressed in four coordinates, and the four coordinates are expressed as three dimensional coordinates plus a fourth coordinate that represents a height of the coating above a surface of the object;

vectorizing the point cloud into a vector data structure; and applying a neural network to the vector data structure, wherein an output of the neural network comprises an output vector that includes a prediction of whether at least one point in the point cloud is within an engineering tolerance defined for the coating.

15. The method of claim 14, further comprising:

generating training data by labeling at least some points of the point cloud with a corresponding status of the coating at each of the at least some points;

training, iteratively until convergence, the neural network with the training data.

\* \* \* \* \*